United States Patent [19]
Nakayama et al.

[11] Patent Number: 4,473,128
[45] Date of Patent: Sep. 25, 1984

[54] VEHICULAR POWER STEERING SYSTEM

[75] Inventors: Masafumi Nakayama, Yamato; Tokiyoshi Yanai, Yokosuka; Masato Fukino, Yokohama, all of Japan

[73] Assignee: Nissan Motor Co., Ltd., Yokohama, Japan

[21] Appl. No.: 401,017

[22] Filed: Jul. 22, 1982

[30] Foreign Application Priority Data

Aug. 5, 1981 [JP] Japan .............................. 56-122601

[51] Int. Cl.$^3$ .......................... B62D 5/04; B62D 5/06
[52] U.S. Cl. ................................ 180/142; 74/388 PS; 91/450; 180/79.1; 180/141; 361/236
[58] Field of Search .............. 180/141, 142, 143, 79.1; 74/388 PS; 91/375 A, 437, 458, 450; 361/236, 242

[56] References Cited

U.S. PATENT DOCUMENTS

| | | | |
|---|---|---|---|
| 2,987,135 | 6/1961 | Harvey | 180/141 |
| 2,990,902 | 7/1961 | Cataldo | 180/142 X |
| 3,692,137 | 9/1972 | Inoue | 180/142 |
| 3,882,954 | 5/1975 | Inoue | 180/143 |
| 3,897,846 | 8/1975 | Inoue | 180/142 |
| 3,948,338 | 4/1976 | Toshioka et al. | 180/147 |
| 4,047,728 | 9/1977 | Takahashi et al. | 180/141 |
| 4,071,109 | 1/1978 | Ezoe | 180/143 |
| 4,119,172 | 10/1978 | Yanagishima et al. | 180/142 X |
| 4,274,504 | 6/1981 | Kawabata et al. | 180/143 |
| 4,392,540 | 7/1983 | Michio et al. | 180/142 |

FOREIGN PATENT DOCUMENTS

| | | | |
|---|---|---|---|
| 2356835 | 7/1974 | Fed. Rep. of Germany | 180/143 |
| 2412337 | 10/1974 | Fed. Rep. of Germany | 180/143 |
| 1379606 | 1/1975 | United Kingdom | 180/141 |
| 1392079 | 4/1975 | United Kingdom | 180/143 |
| 2035931 | 6/1980 | United Kingdom | . |

OTHER PUBLICATIONS

F. J. Adams, "Automotive Power Steering 'Feel'", Proc. Instn. Mech. Engrs., vol. 195, pp. 29-36 (Mar. 1981).

Primary Examiner—Joseph F. Peters, Jr.
Assistant Examiner—Mitchell J. Hill
Attorney, Agent, or Firm—Lane, Aitken and Kananen

[57] ABSTRACT

In a vehicular power steering system, the hydraulic fluid supply to a hydraulic power actuator is controlled in accordance with the vehicle speed and the angular velocity of the steering wheel. Preferably, the fluid supply is reduced so that the steering effort becomes heavier as the vehicle speed increases while the fluid supply is increased when the angular velocity of the steering wheel is high. To control the fluid supply, there is provided, in a power steering system, a bypass valve means for draining a portion of the fluid flow to bypass the power actuator, and control means for producing a control signal to control the bypass valve means in accordance with the vehicle speed and the angular velocity of the steering wheel.

4 Claims, 3 Drawing Figures

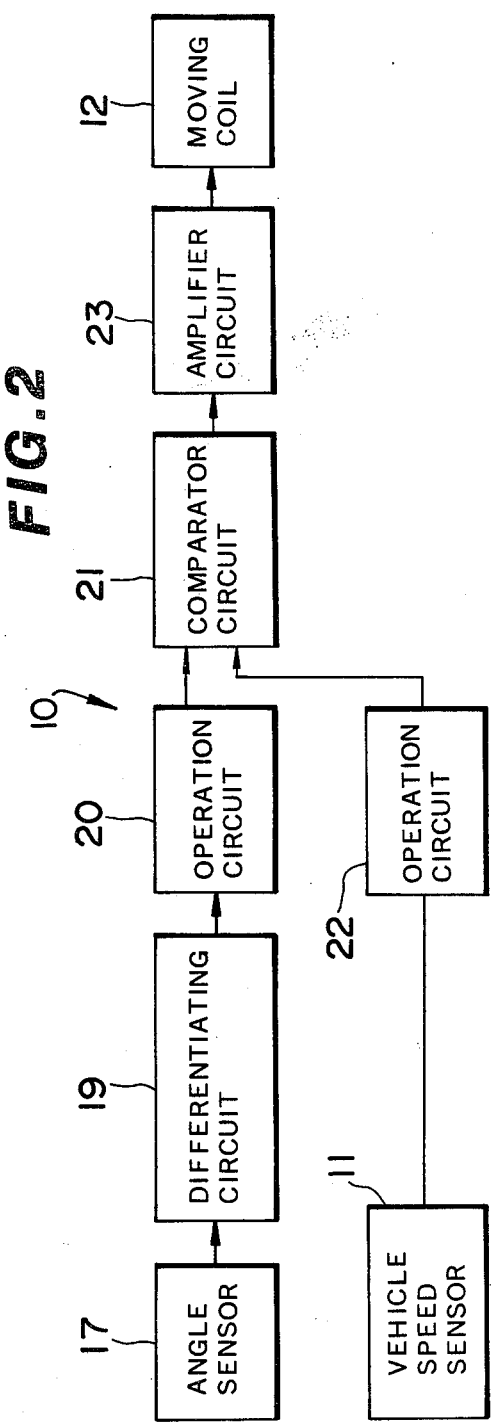
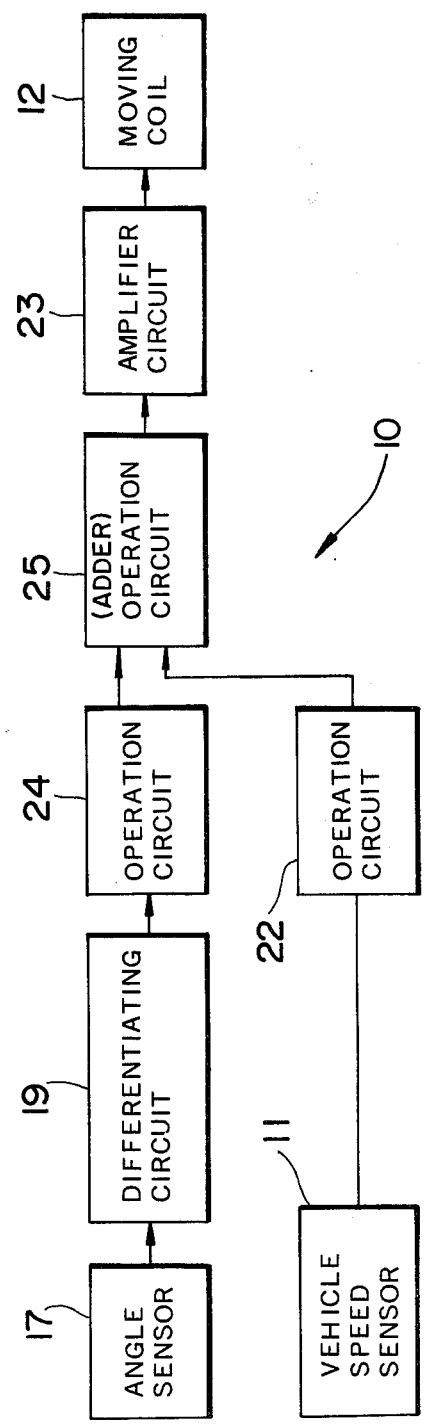

VEHICULAR POWER STEERING SYSTEM

BACKGROUND OF THE INVENTION

The present invention relates to a vehicular power steering system, and more specifically, to a vehicular power steering system having means for controlling the degree of power assistance.

Vehicular power steering systems make the steering light and reduce driver fatigue. However, it is desirable to reduce the degree of power assistance in accordance with the vehicle speed because the steering becomes unstable and dangerous if the steering is too light at high vehicle speeds. On the other hand, if the steering wheel is turned rapidly, more hydraulic fluid is demanded by a hydraulic cylinder actuator of the power steering system. Accordingly, a rapid steering wheel movement tends to cause a lack of fluid supply to the cylinder actuator, resulting in a dangerous abrupt change of the steering effort.

SUMMARY OF THE INVENTION

It is an object of the present invention to provide a vehicular power steering system in which the degree of power assistance is controlled in accordance with not only the vehicle speed but also the angular velocity of the steering wheel.

It is another object of the present invention to provide a vehicular power steering system in which a lack of the hydraulic fluid supply to a hydraulic cylinder actuator is prevented by monitoring the steering wheel movement even when the hydraulic fluid supply is reduced in accordance with the vehicle speed.

According to the present invention, a vehicular power steering system comprises a steering mechanism comprising a steering wheel, a hydraulic power cylinder for providing power assistance to the steering mechanims by transmitting mechanical work converted from hydraulic power to the steering mechanism, a fluid pump, and a servo valve, connected with the fluid pump through a supply line for supplying hydraulic fluid from the pump to the servo valve and a return line for returning it from the servo valve to the pump, for controlling the hydraulic fluid flow and introducing a fluid pressure to the power cylinder in accordance with the movement of the steering wheel. The power steering system of the present invention further comprises bypass control valve means, disposed in a bypass line connected between the supply line and the return line to bypass the servo valve, for controlling the rate of the fluid supply to the servo valve thereby to control the degree of power assistance by controlling the flow rate through the bypass line in response to an input control signal which is produced by control means. The control means is connected with a vehicle speed sensor for sensing the speed of the vehicle, and an angle sensor for sensing an angular displacement of the steering wheel. The control means produces the control signal to control the bypass valve means and thereby to control the fluid supply to the servo valve in accordance with the vehicle speed and the angular velocity of the steering wheel.

BRIEF DESCRIPTION OF THE DRAWINGS

FIG. 2 is a block diagram showing a control circuit of FIG. 1;

FIG. 3 is a block diagram showing another example of the control circuit of FIG. 1.

DETAILED DESCRIPTION OF THE INVENTION

Figure 1:
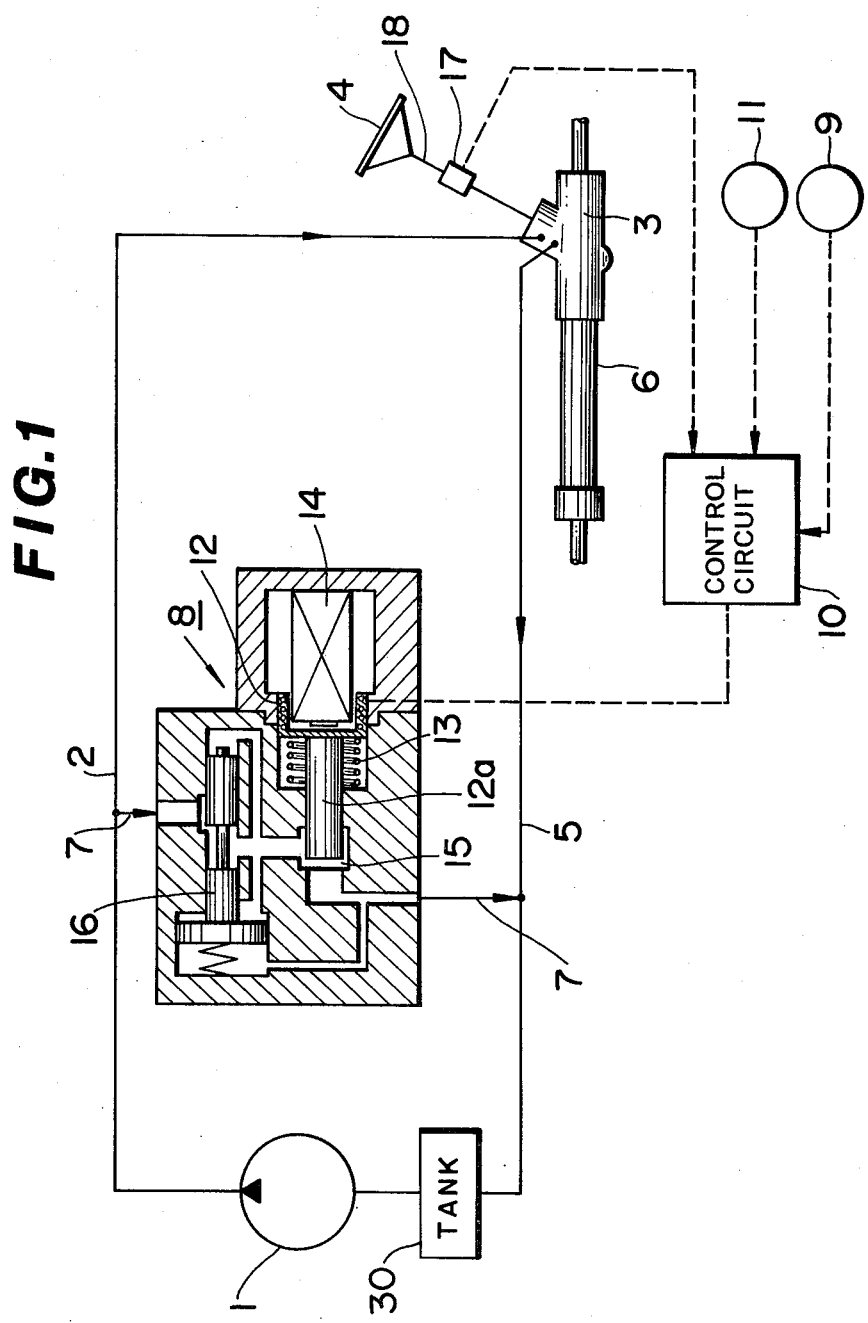
FIG. 1 is a schematic view showing a power steering system according to the present invention.

In FIG. 1, a pump 1 containing a flow control valve draws hydraulic fluid oil from an oil tank 30 and forces it out always at a constant flow rate, into a supply line 2. This hydraulic fluid oil is supplied to a servo valve 3 of an open center type, which produces a fluid pressure on the upstream side in accordance with steering wheel movement, and returns excess oil to the pump 1 through a return line 5. The fluid pressure produced by the servo valve 3 is introduced into a proper one of the two power chambers of a power cylinder 6, and thus provides a power assistance.

There is further provided, between the supply line 2 and the return line 5, a bypass line 7 bypassing the servo valve 3. A bypass control valve 8 is disposed in the bypass line 7 for controlling the flow through the bypass line 7. The bypass control valve 8 is controlled by a control circuit 10 which is provided with electric power from a power source 9. The control circuit 10 supplies an electric current of a controlled magnitude to a moving coil 12 of the bypass valve. By a repulsive force between the moving coil 12 and a fixed coil 14 caused by the supplied current, a plunger 12a which is fixed with the moving coil 12 and urged toward the right in FIG. 1 by a spring 13, is moved toward the left. This leftward movement of the plunger 12a reduces the opening degree of a variable orifice 15 to control the flow rate through the bypass line 7. In this way, the control circuit 10 is capable of controlling the amount of fluid supply to the servo valve 3 by controlling the fluid flow through the bypass line 7. The bypass valve 8 further has a spool 16 which is arranged to maintain the pressure difference between the both sides of the orifice 15 constant, so that the amount of the fluid flowing through the bypass line 7 is not influenced by a change of the assist pressure produced by the servo valve 3 but is corrected controlled by the opening degree of the orifice 15.

The control circuit 10 controls the bypass valve 8 in accordance with two input signals, one from a vehicle speed sensor 11 and the other from an angle sensor 17 for sensing an angular displacement of the steering wheel 4. For example, the angle sensor 17 is composed of a potentiometer provided to a steering shaft 18.

As shown in FIG. 2, the control circuit 10 comprises a differentiator or a differentiating circuit 19, two operation circuits 20 and 22, a comparator 21, and an amplifier 23. The angle signal of the angle sensor 17 indicative of an angular displacement of the steering wheel 4 is first fed to the differentiator 19, which differentiates the angle signal and produces an angular velocity signal indicative of the time rate of change of the angular displacement. The time rate of change of the angular displacement is the angular velocity of the steering wheel. This angular velocity signal of the differentiator 19 is supplied to the operation circuit (second operation circuit) 20. The operation circuit 20 calculates a desired quantity or of the fluid supply to the servo valve 3 in accordance with the angular velocity of the steering wheel. In this case, the desired quantity of the fluid supply rate is determined in accordance with an increase rate of the capacity of one power chamber of the power cylinder 6 so as to prevent a lack of the hydraulic fluid supply to the power cylinder 6. The increase rate of the capacity of one power chamber of the power cylinder 6 is determined by the angular velocity of the steering wheel. If the fluid supply to the power cylinder 6 is smaller than the increase rate of the capacity of one power chamber of the power cylinder 6, this results in a lack of the fluid supply to the power cylinder 6. Therefore, in order to prevent a lack of the fluid supply to the power cylinder 6, the desired quantity must not be smaller than, but must be equal to or greater than this increase rate of the capacity of one power chamber of the power cylinder 6. Thus, the operation circuit 20 produces an output signal indicative of the calculated desired quantity and sends this output signal to the comparator 21.

On the other hand, the vehicle speed signal of the vehicle speed sensor 11 is sent to the operation circuit (first operation circuit) 22 of the control circuit 10, which determines a basic quantity $Q_b$ of the fluid supply in accordance with the vehicle speed. The operation circuit 22 determines the basic quantity of the fluid supply to control the fluid supply to the servo valve 3 in such a manner that the steering effort is made heavier as the vehicle speed increases. That is, the basic quantity is decreased as the vehicle speed increases. The output signal of the operation circuit 22 indicative of the thus determined basic quantity of the fluid supply is supplied to the comparator 21.

The comparator 21 compares the signal from the operation circuit 20 and the signal from the operation circuit 22, and allows a greater one of both signals to pass to the amplifier 23 whichever signal is greater. That is, the comparator 21 compares the basic quantity $Q_b$ determined by the operation circuit (second operation circuit) 22 and the desired quantity $Q_d$ determined by the operation circuit (first operation circuit) 20, and then determines an actual quantity of the fluid supply rate which is equal to the basic quantity if the basic quantity is equal to or greater than the desired quantity, and which is equal to the desired quantity if the desired quantity is greater than the basic quantity. Thus, the comparator 21 produces a signal indicative of the determined actual quantity, and supplies the signal to the amplifier 23. The amplifier 23 amplifies the input signal and then supplies it to the moving coil 12.

Thus, the bypass valve 8 reduces the fluid supply to the servo valve 3 by increasing the flow rate of the fluid flowing through the bypass line 7 as the vehicle speed increases in order to make the steering effort heavier at higher vehicle speeds. On the other hand, the bypass valve 8 increases the fluid supply beyond the amount determined by the vehicle speed if the driver turns the steering wheel 4 so rapidly that the amount of the fluid required by the power cylinder 6 exceeds the fluid supply determined by the vehicle speed. Thus, the fluid supply is controlled to satisfy the demand of the power cylinder 6 even if the angular velocity of the steering wheel 4 is high, so that this system can avoid the possibility that the steering effort becomes heavy abruptly by reason of a lack of the fluid supply.

Another embodiment of the present invention is shown in FIG. 3. In this embodiment, the rate of the fluid supply determined by the vehicle speed is modified in accordance with the angular velocity signal. In the control circuit shown in FIG. 3, the operation circuit 20 and the comparator 21 in FIG. 2 are replaced by two operation circuits 24 and 25. The operation circuit 24 (demanded quantity determining circuit) receives the angular velocity signal from the differentiator 19 as in the preceding embodiment, determines a demanded quantity $Q_d$ of the fluid supply, that is, an increase rate of the capacity of one chamber of the power cylinder 6 corresponding to the angular velocity of the steering wheel 4, and produces an output signal indicative of the determined demanded quantity of the fluid supply. The output signal of the operation circuit 24 is supplied to the operation circuit (adder circuit) 25 which adds the signal of the operation circuit 24 to the signal from the operation circuit 22, and sends an output signal indicative of the sum to the amplifier 23. That is, in this embodiment, the actual quantity in accordance with which the fluid supply to the servo valve is actually controlled, is determined by the operation circuit (adder circuit) 25 so that the actual quantity is the sum of the basic quantity and the demanded quantity. The amplifier 23 amplifies the input signal and supplies it to the moving coil 12.

Accordingly, when the vehicle is running at high speed without manipulation of the steering wheel, the operation circuit 25 is provided with no signal from the operation circuit 24, and controls the fluid supply to the servo valve 3 in accordance with the vehicle speed. If the steering wheel 4 is turned when the vehicle is running at high speed, the operation circuit 24 produces the output signal indicative of the fluid supply rate demanded in accordance with the angular velocity of the steering wheel, and the operation circuit 25 adds this output signal of the operation circuit 24 to the signal from the operation circuit 22. Thus, the fluid supply is increased when the angular velocity of the steering wheel is high, so that a lack of fluid supply is prevented even when the steering wheel is turned rapidly at high vehicle speed.

What is claimed is:

1. A vehicular power steering system comprising:
   a steering mechanism;
   a hydraulic power cylinder for transmitting mechanical work converted from hydraulic power to said steering mechanism for effecting power assistance,
   a fluid pump,
   a servo valve, connected with said pump through a supply line and a return line, for controlling the fluid flow and introducing a fluid pressure to said lower cylinder in accordance with the movement of a steering wheel of said steering mechanism,
   bypass control valve means, disposed in a bypass line connected between said supply line and said return line to bypass said servo valve, for controlling . the flow rate through said bypass line in response to an input control signal, said bypass control valve means capable of controlling the degree of power assistance by controlling the flow rate through said bypass line and thereby controlling the amount of the fluid supply to said servo valve,
   a vehicle speed sensor for sensing the speed of the vehicle,
   an angle sensor for sensing an angular displacement of the steering wheel, and
   control means for producing said control signal to control said bypass valve means, said control means being capable of controlling the fluid supply to said servo valve by means of said control signal, said control means being connected with said speed sensor and said angle sensor, said control means determining the angular velocity of the steering wheel from the angular displacement of the steering wheel, said control means controlling the fluid supply to said servo valve in accordance with the vehicle speed and the angular velocity of the steering wheel, said control means decreasing the fluid supply to said servo valve in a predetermined manner as the vehicle speed increases, said control means increasing the fluid supply in accordance with the angular velocity of the steering wheel so as to prevent the fluid supply from becoming lower than a demanded quantity which is equal to an increase rate of the capacity of one power chamber of said power cylinder and which is determined by the angular velocity of the steering wheel.

2. A power steering system according to claim 1, wherein said control means determines a basic quantity representative of fluid supply to said servo valve in accordance with the vehicle speed, and an actual quantity representative of fluid supply to said servo valve in accordance with said basic quantity and the angular velocity of the steering wheel during turning, said control means decreasing said basic quantity in the predetermined manner as the vehicle speed increases, said actual quantity being equal to or greater than either of said basic quantity or said demanded quantity, said control means controlling the fluid supply to said servo valve so that the fluid supply is maintained equal to said actual quantity.

3. A power steering system according to claim 2, wherein said control means comprises:
   a differentiator, connected with said angle sensor, for determining the angular velocity of the steering wheel,
   a first operation circuit, connected with said speed sensor, for determining said basic quantity representative of fluid supply,
   a second operation circuit, connected with said differentiator, for determining a desired quantity representative of fluid supply to said servo valve in accordance with the angular velocity of the steering wheel, said desired quantity being equal to or greater than said demanded quantity representative of fluid supply,
   a comparator, connected to said first and second operation circuits, for determining said actual quantity representative of fluid supply, said actual quantity being equal to said basic quantity when said basic quantity is equal to or greater than said desired quantity, said actual quantity being equal to said desired quantity when said basic quantity is smaller than said desired quantity, and
   an amplifier, connected with said comparator, for producing said control signal in accordance with said actual quantity.

4. A power steering system according to claim 2, wherein said control means comprises:
   a differentiator, connected with said angle sensor, for determining the angular velocity of the steering wheel,
   a first operation circuit, connected with said speed sensor, for determining said basic quantity representative of fluid supply,
   a demanded quantity determining circuit, connected with said differentiator, for determining said demanded quantity representative of fluid supply in accordance with the angular velocity of the steering wheel,
   an adder circuit, connected with said first operation circuit and said demanded quantity determining circuit, for determining said actual quantity representative of fluid supply, said actual quantity being equal to the sum of said basic quantity and said demanded quantity, and
   an amplifier, connected with said adder circuit, for producing said control signal in accordance with said actual quantity.

* * * * *